United States Patent [19]

Fukushima et al.

[11] Patent Number: 4,816,509
[45] Date of Patent: Mar. 28, 1989

[54] WATER SWELLABLE SEALANT

[75] Inventors: Takuo Fukushima, Yachiyo; Yasumasa Hayashida, Ageo; Jinichi Omi, Tokyo, all of Japan

[73] Assignee: Asahi Denka Kogyo K.K., Tokyo, Japan

[21] Appl. No.: 827,303

[22] PCT Filed: Jun. 25, 1985

[86] PCT No.: PCT/JP85/00359
§ 371 Date: Jan. 29, 1986
§ 102(e) Date: Jan. 29, 1986

[87] PCT Pub. No.: WO86/00328
PCT Pub. Date: Jan. 16, 1986

[30] Foreign Application Priority Data

Jun. 29, 1984 [JP] Japan ................... 59-134444

[51] Int. Cl.$^4$ .......................... C08K 3/40; C08K 3/26; C08K 3/22; C08K 3/04
[52] U.S. Cl. .................................. 524/413; 524/425; 524/590; 524/875; 428/425.8
[58] Field of Search ............... 524/590, 875, 413, 425; 521/905, 159, 160; 528/60, 66, 904; 428/425.8; 525/458

[56] References Cited

U.S. PATENT DOCUMENTS

| | | | |
|---|---|---|---|
| 3,094,495 | 6/1963 | Gemeinhardt | 521/159 |
| 3,730,927 | 5/1973 | Schloss | 528/66 |
| 4,513,112 | 4/1985 | Ernst et al. | 524/590 |

Primary Examiner—Veronica P. Hoke
Attorney, Agent, or Firm—Birch, Stewart, Kolasch & Birch

[57] ABSTRACT

Water-swellable moisture-curing one-package polyurethane sealant which includes (1) a water-swellable polyurethane prepolymer having 1.5–10% terminal NCO group content obtained by reacting polyisocyanate with polyoxyalkylenepolyol having 50–90% of oxyethylene units based on polyalkylene chain molecular weight (2) non water-swellable polyurethane prepolymer having terminal NCO groups obtained by reacting polyisocyanate with polyoxyalkylenepolyol having 3–4 carbon atom oxyalkylene units, and (3) a filler. The sealant exhibits has been improved storage stability.

22 Claims, 1 Drawing Sheet

Days When A Sample Has Been Immerged

WATER SWELLABLE SEALANT

FIELD OF THE INVENTION

The present invention relates to a water-swellable moisture-curing one-package polyurethane sealant of which storage stability is improved.

More particularly, the present invention relates to a water-swellable moisture-curing one-package polyurethane sealant which has a rapid curing rate, take a short time to become tack free, exhibits excellent mechanical strength in its cured form, and exhibits excellent water-sealing effects.

DESCRIPTION OF THE PRIOR ART

A one package type polyurethane sealant has conventionally been widely used for sealing material, binder material, and caulking material in the field of public and construction works. Recently, use of water-swellable material has gradually become popular in order to improve the water-sealing effect for joint sealing or on hume pipies. A water-swellable one-package sealant is very much required in the public and construction works because of its easy workability and excellent water-sealing effect.

Japanese patent (examined) No. 49-30209 discloses a fairly good polyurethane sealant. It has, however, insufficient storage stability in the case that a filler is added in order to adapte the sealant to practical use. This is caused by an increase in the viscosity or partial curing induced by the reaction of the water in the filler and the urethanprepolymer.

SUMMARY OF THE INVENTION

The inventors studied the storage stability of the sealant and discovered that a mixture of a specific water-swellable polyurethane prepolymer and a non water-swellable polyurethane prepolymer produces a water-swellable moisture-curing one-package polyurethane prepolymer which possesses remarkably improved storage stability.

The water-swellable moisture-curing one-package polyurethane sealant of the present invention essentially comprises, (1) water-swellable polyurethane prepolymer having a content of 1.5–10% of terminal NCO groups which is obtained by reacting polyisocyanate with one or more polyetherpolyols having the following general formula, $$R[(OR_1)_nOH]_p \qquad (I)$$

wherein R is a polyhydric alcohol radical; $(OR_1)_n$ is a polyoxyalkylene chain comprising 50–90 weight % of oxyethylene units and 50–10 weight % of oxyalkylene units having 3–4 carbon atoms; n is the number which represents the polymerization degree of said polyoxyalkylene chain, such that n restricts the hydroxy group equivalent of the said polyetherpolyol in the range 500–4000; and p is a number selected from 2–8

(2) A non water-swellable polyurethane prepolymer having terminal NCO groups obtained by reacting polyisocyanate with one or more polyetherpolyols, having the following general formula, $$R_2[(OR_3)_mOH]_q \qquad (II)$$

wherein $R_2$ is a polyhydric alcohol radical; $(OR_3)_m$ is polyoxyalkylene chain comprising oxyalkylene units having 3–4 carbon atoms, m is a number which represents the polymerization degree of said polyoxyalkylene chain, such that m restricts the hydroxy group equivalent of said polyetherpolyol in the range 500–4000; and q is a number selected from 2–8 and (3) a filler.

DETAILED DESCRIPTION OF THE INVENTION

The preferred examples of the polyhydric alcohols which correspond to R in the above general formula (I) are aliphatic dihydric alcohols (ethylene glycol, propylene, glycol, 1,4-butylene glycol, neopentyl glycol etc.), aliphatic trihydric alcohols, (glycerol, trioxyisobutane, 1,2,3-butanetriol, 2-methyl-1,2,3-propanetriol, 2-ethyl-1,2,3-butanetriol, 2,3,4-pentanetriol, 2,3,4-hexanetriol, 4-propyl-3,4,5-heptanetriol, 2,4-dimethyl-2,3,4-pentanetriol, pentamethylglycerol, pentaglycerol, 1,2,4-butanetriol, 1,2,4-pentanetriol, trimethylolpropane etc.), aliphatic tetrahydric alcohols (erythrite, pentaerythrite, 1,2,3,4-pentanetetrol, 2,3,4,5-hexanetetrol, 1,2,3,5-pentanetetrol, 1,3,4,5-hexanetetrol etc.), aliphatic pentahydric alcohols (adonite, arabit, xylit etc.), aliphatic hexahydric alcohols (sorbit, mannit, idite etc.). The preferred polyhydric alcohols are di, tri, or tetrahydric alcohols, particularly propylene glycol and glycerol.

Polyetherpolyols represented by the above general formula (I) can be obtained by adducting ethylene oxide and alkylene oxides having 3–4 carbon atoms to the above-noted polyhydric alcohols using a conventional method, so as to provide for proper molecular weight and ethylene oxide unit content. While ethylene oxide and alkylene oxides having 3–4 carbon atoms can be adducted in random or in blocks to form polyetherpolyols, the is preferred in the present invention. The preferred examples of the alkylene oxide have 3–4 carbon atoms are propylene oxide and butylene oxide, particularly propylene oxide.

The content of the oxyethylene unit in the polyetherpolyol is 50–90 weight %. If the content is over 90 weight %, polyurethane prepolymer having NCO groups may crystallize at the room temperature so as to lose its good workability. If the content is below 50 weight %, the effect of the present invention is not found. The 50–90 weight % content of the ethylene oxide unit is particularly preferred in the case of a random type polyoxyalkylene chain, and a 70–90 weight % content is particularly preferred in the case of a block type polyoxyalkylene chain.

It is preferred to use a polyetherpolyol hving a molecular weight of 1000–10,000, particularly 2000–10,000 in the case of tri or higher polyfunctional polyetherpolyols obtained by originally using tri or higher polyhydric alcohols.

The preferred examples of the polyetherpolyols represented by the above general formula (I) are the difunctional polyetherpolyols represented by the following general formula, $$R'[(OR'_1)_nOH]_2 \qquad (I-1)$$

wherein R' is dihydric alcohol radical; $(OR'_1)_n$ is a polyoxyalkylene chain comprising 50–90 weight % of oxyethylene units and 50–10 weight % of oxypropylene units; n is a number which represents the polymerization degree of said polyoxyalkylene chain, such the n restricts the hydroxy group equivalent of the polyetherpolyol in the range 500–4000.

The preferred examples of such difunctional polyetherpolyols are polyethers having 500-4000 of hydroxy group equivalent and 50-90 weight % ethylene oxide content obtained by adducting ethylene oxide and propylene oxide to propylene glycol in a random or block manner.

Other preferred examples of the polyetherpolyols represented by the above general formula (I) are the trifunctional polyetherpolyols represented by the following general formula, R''[(OR'$_1$)$_n$OH]$_3$  (I-2)

wherein R'' is trihydric alcohol radical; (OR'$_1$)$_n$ is polyoxyalkylene chain comprising 50-90 weight % of oxyethylene units and 50-10 weight % of oxypropylene units; and n is a number which represents the polynerization degree of said polyoxyalkylene chain, such that n restricts the hydroxy group equivalent of the polyetherpolyol in the range 500-4000.

The preferred examples of such trifunctional polyetherpolyols are the polyethers having 500-4000 of hydroxy group equivalent and 50-90 weight % ethylene oxide content obtained by adducting ethylene oxide and propylene oxide to propylene glycol in a random or block manner.

It is preferred to use, as the water-swellable polyurethane prepolymer (1) of the present invention, a terminal NCO group containing prepolymer obtained by reacting polyisocyanates with a mixture of difunctional polyetherpolyol (I-1) obtained by orginally using dihydric alcohols, such as propylene glycol and trifunctional polyetherpolyol (I-2) obtained by orginally using trihydric alcohols such as glycerol.

It is specially preferred to mix difunctional polyetherpolyol (I-1) and trifunctional polyetherpolyol (I-2) in the weight ratio 9:1-7:3.

The examples of polyisocyanates of the present invention are the isocyanates represented by the following general formula

wherein 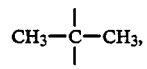 is a benzene ring or haphthalene ring, —NCO is ring substituted isocyanate group, Z is ring substituted halogen atom or alkyl or alkoxy group having 3 or less carbon atoms, and n is the number 0, 1, or 2, such as 2,4-toluenediisocyanate, 2,6-toluenediisocyanate, 1,4-naphthylenediisocyanate, 1,5-naphthylenediisocyanate, 1,3-phenylenediisocyanate, 1,4-phenylenediisocyanate, and 1-isopropylbenezene-2,4-diisocyanate;

the isocyanates represented by the following general formula

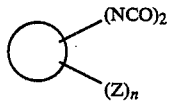

wherein ◯ is a benzene ring or naphthalene ring, —(CH$_2$)$_m$NCO is a ring substituted alkyleneisocyanate group, Z is a ring substituted halogen atom or alkyl or alkoxy group having 3 or less carbon atoms, and n is the number 0, 1, or 2, such as ω,ω'-diisocyanate-1,2-dimethylbenzol, and ω,ω'-diisocyanate-1,3-dimethylbenzol;

The isocyanates represented by the following general formula

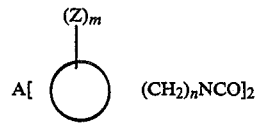

wherein A is —CH$_2$— or an alkylene group having 3 or more carbon atoms such as $$CH_3-\underset{|}{\overset{|}{C}}-CH_3,$$

◯ is a benzene ring or naphthalene ring, Z is a ring substituted halogen atom or alkyl or alkoxy group having 3 or less carbon atoms, and n is the number 0, 1, or 2, such as 4,4'-diphenylmethanediisocyanate, 2,2'-dimethyldiphenylmethanediisocyanate, and 3,3'-dichroldiphenyldimethylmethane-4,4'-diisocyanate;

the isocyanates represented by the following general formula

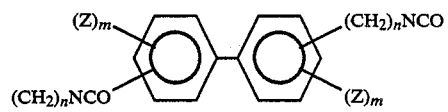

wherein Z is a ring substituted halogen atom or alkyl or alkoxy group having 3 or less carbon atoms, and m is the number 0, 1, or 2, such as biphenyl 2,4-diisocyanate, biphenyl-4,4'-diisocyanate, 3,3'-dimethylbiphenyl4,4'-diisocyanate, 3,3'-dimethoxybiphenyl-4,4'diisocyanate;

diphenylsulfone-4,4'-diisocyanate;

the isocyanates obtained by hydrogenating the aromatic rings of the above mentioned isocyanates such as dicyclohexane-4,4'-diisocyanate, ω,ω'-diisocyanate-1,2-dimethylbenzene, ω and, ω'-diisocyanate-1,3-dimethylbenzene;

the isocyanates having a substituted urea group obtained by reacting 1 mol of water and 2 mols of diisocyanate, such as for example, ureadiisocyanate obtained by reacting 1 mol of water and 2 mols of 2,4-toluenediisocyanate;

urethodionediisocyanate obtained by dimerizing aromatic diisocyanates by a conventional method; propane-1,2-diisocyanate;

2,3-dimethylbutane-2,3-diisocyanate;
2-methylpentane-2,4-diisocyanate;
octane-3,6-diisocyanate;
3,3-dinitropentane-1,5-diisocyanate;
octane-1,6-diisocyanate; and
hexamethylenedisocyanate.

Water-swellable polyurethane prepolymer (1) of the present invention can be obtained by conventionally reacting a polyetherpolyol represented the general formula (I) and a polyisocyanate so as to provide for 1.5-10% (preferably 1.5-5%) of terminal NCO group content. The reaction can be executed for example by heating reactants at a temperature of 80°–90° C. for 2–3 hours.

The preferred examples of the polyhydric alcohols which correspond to $R_2$ in the above general formula (II) are the same alcohols, such as di, tri, tetra, penta, or hexahydric alcohols, mentioned above in the description of R.

Polyetherpolyols represented by the above general formula (II) can be obtained by adducting alkylene oxides having 3-4 carbon atoms to said polyhydric alcohols by a conventional method, so as to provide for proper molecular weight. Examples of the alkylene oxides having 3-4 carbon atoms are propylene oxide and butylene oxide. Amon them, propylene oxide is particularly preferable.

It is preferred to use a polyetherpolyol having a molecular weight of 1000 to 9000, particularly 2000-9000 in the case tri or higher functional polyetherpolyol.

It is preferred to use, as the non water-swellable polyurethane prepolymer (2) of the present invention, a terminal NCO group containing prepolymer obtained by reacting polyisocyanate with the mixture of a difunctional polyetherpolyol obtained by originally using dihydric alchols, such as propylene glycol, and a trifunctional polyetherpolyol obtained by originally using trihydric alcohols such as glycerol. It is specially preferred to mix di and trifunctional polyetherpolyols in the weight ratio 9:1–1:9.

The suitable polyisocyanates used for preparing polyurethane prepolymer (2) are the same isocyanates mentioned above in the description of polyurethane prepolymer (1). Particularly, 4,4'-diphenylmethanediisocyanate (MDI) is desirable for the sealant's good adhesiveness.

Polyurethane prepolymer (2) of the present invention can be obtained by conventionally reacting polyethers and polyisocyanates for example at a temperature of 90° C. for 3 hours.

Filler (3), another essential component of the sealant of the present invention, can be selected from following materials: calcium carbonate, pearlite, silicon oxide, talc, vermiculite, wollastonite, glass, carbon black and so on. Among these fillers, one or more than one material can be selected. Calcium carbonate, silicon oxide, titanium oxide, and carbon black are the most desirable filler.

The sealant composition of the present invention can be included in various plasticisers, thixotropic agents, or asphalt materials if necessary. Typical examples of the plasticisers are dioctylpthalate, of the thixotropic agents—bentonite, metal soap, hydrogenated castor oil, or asbeste powder, one of the asphalt materials—coal tar, wood tar, oil gas tar, petroleum asphalt, or pitch.

The polyurethane sealant of the present invention can be prepared by adding filler (3) to the non water-swellable polyurethane prepolymer (2) to form a one-package sealant (non water-swellable), and further adding the water-swellable polyurethane prepolymer (1) to the resulting one-package sealant. Plasticisers, thixotropic agents, and asphalt materials are preferably added with filler (3).

The preferred sealant composition of the present invention comprises 100 weight parts of non water-swellable prepolymer (2), 2–100 (more preferably 10–70) weight parts of filler (3), and 20–100 (more preferably 30–70) weight parts of water-swellable prepolymer (1).

The sealant of the present invention can be used, for example, for sealing, binding, or caulking materials in joints of corrugated board, slate, plastic sheets, aluminum sheets, sheet zinc, glass, concrete, tile pipes, road coatings, floor coating, motor vehicles, boats, planes, or pipings in the field of building and construction.

The sealant of the present invention can be applied, for example, by disposing it into a joint with a caulking gun, coating it on a surface with a brush, or setting cured sealant in a joint.

EFFECT OF THE INVENTION

The effect of the present invention is to provide a water-swellable moisture-curing one-package polyurethane sealant of which storage stability is improved. Another effect of the present invention is to provide a water-swellable moisture-curing one-package polyurethane sealant which has good mechanical strength and excellent water stopping effect.

Figure 1:
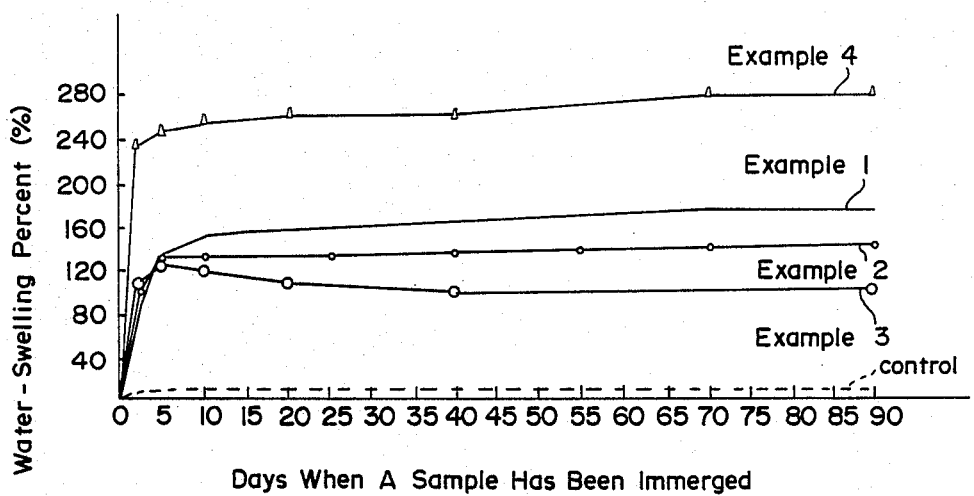
FIG. 1 is a graph showing the change of the sealant's water swelling percent for elasped periods of time.

1. steel vessel
2. polyurethane sealant
3. water pouring mouth
4. water pressure gauge

PREFERRED EMBODIMENTS OF THE INVENTION

Hereinafter part means weight part.

EXAMPLE 1

313 parts of 4,4'-diphenylmethanediisocyanate and 1500 parts of polyether having a molecular weight 4500 obtained by adducting propylene oxide to glycerol were mixed and reacted at 90° C. for 3 hours conventionally to obtain polyurethane prepolymer containing 3.5% of terminal NCO group content. (Prepolymer A)

23 parts of calcium carbonate and 10 parts of titanium oxide were added to 100 parts of Prepolymer A to obtain a sealant composition.

20 parts of trifunctional polyether having a molecular weight of 7000 and an 80% oxyethylene unit content obtained by adducting in random propylene oxide and ethylene oxide to glycerol and 80 parts of difunctional polyether having a molecular weight of 5000 and 70% oxyethylene unit content obtained by adducting in random ethylene oxide to propylene glycol were mixed. Toluenediisocyanate was added to the resulting polyether mixture and reacted at a temperature 90° C. for about 3 hours to obtain water-swellable polyurethane prepolymer having 1.8% terminal NCO group content. (Prepolymer B)

30 parts of Prepolymer B was added to 100 parts of the sealant composition to obtain a water-swellable moisture-curing one-package polyurethane sealant.

The resulting sealant had good stability and availability after 6 months storage in an atmosphere of nitrogen gas. In order to estimate the sealant's poperties, it was coated on a glass plate in a thickness of 2 mm and cured at room temperature. The mechanical strength of the cured sealant was measured and illustrated in Table 1.

COMPARATIVE EXAMPLE 1

23 parts of calcium carbonate and 10 parts of titanium oxide were added to 100 parts of Prepolymer B to obtain a sealant composition. The sealant composition ably showed an increase in its viscosity for 5 days in an atmosphere of nitrogen gas and half-cured after 10 days. It is obvious that the storage stability of the sealant composition of Comparative example 2 is very much poorer than that of the sealnt of Example 1.

TABLE 1

|  | SEALANT COMPOSITION (PARTS) |  | SEALANT PREPARATION |
|---|---|---|---|
| EXAMPLE 1 | PREPOLYMER A (NON WATER-SWELLABLE) | 100 | Water-swellable sealant was obtained by adding |
|  | FILLER | 33 | Prepolymer B to the |
|  | PREPOLYMER B (WATER-SWELLABLE) | 40 | mixture of Prepolymer A and filler |
| COMPARATIVE EXAMPLE 1 | PREPOLYMER B (WATER-SWELLABLE) | 100 | Sealant composition was obtained by mixing |
|  | FILLER | 33 | Prepolymer B and filler |
| EXAMPLE 2 | PREPOLYMER C (NON WATER-SWELLABLE) | 100 | Water-swellable sealant was obtained by adding |
|  | FILLER | 33 | Prepolymer B to the |
|  | PREPOLYMER B (WATER-SWELLABLE) | 40 | mixture of Prepolymer C and filler |
| COMPARATIVE EXAMPLE 2 | PREPOLYMER A (NON WATER-SWELLABLE) | 100 | Sealant composition was obtained by adding |
|  | PREPOLYMER B (WATER-SWELLABLE) | 30 | filler to the mixture of Prepolymer A and |
|  | FILLER | 43 | Prepolymer B |

|  | STORAGE STABILITY | CURING PROPERTY (2 mm thickness) | PROPERTIES 10 DAYS AFTER CURING |
|---|---|---|---|
| EXAMPLE 1 | Stable for 6 months in the nitrogen gas | Surface tack free: 1 day Complete curing: 1 and half day | Shore A hardness 30 Tensile strength 28 kgf/cm$^2$ Elongation 1750% |
| COMPARATIVE EXAMPLE 1 | Viscosity increasing for 5 days Half-cured and unavailable after 10 days in the nitrogen gas |  |  |
| EXAMPLE 2 | Stable for 6 months in the nitrogen gas | Surface tack free: 1 day Complete curing: 1 and half day | Shore A hardness 27 Tensile strength 25 kgf/cm$^2$ Elongation 1690% |
| COMPARATIVE EXAMPLE 2 | Viscosity increasing for 5 days Half-cured and unavailable after 10 days in the nitrogen gas |  |  | remarkably showed an increase in its viscosity for 5 days in an atmosphere of nitrogen gas and half-cured after 10 days. It is obvious that the storage stability of the sealant composition of Comparative example 1 is very much poorer than that of the sealant of Example 1.

EXAMPLE 2

313 parts of 4,4'-diphenylmethanediisocyanate and 2250 parts of polypropyleneglycol were mixed and reacted at 90° C. for 3 hours conventionally to obtain a polyurethane prepolymer containing 2.5% terminal NCO group content. (Prepolymer C)

23 parts of calcium carbonate and 10 parts of titanium oxide were added to 100 parts of Prepolymer C to obtain a sealant commposition.

30 parts of Prepolymer B was added to 100 parts of the sealant composition to obtain a water-swellable moisture-curing one-package polyurethane sealant.

The resulting sealant had good stability and availability after 6 months storage in an atmosphere of nitrogen gas. The sealant's poperties were measured by the same method as in Example 1 as shown in Table 1.

COMPARATIVE EXAMPLE 2

Prepolymer A and B obtained in Example 1 were mixed by the weight ratio 10:3. 23 parts of calcium carbonate and 10 parts of titanium oxide were added to 100 parts of the resulting prepolymer mixture to obtain a sealant composition. The sealant composition remarkably showed an increase in its viscosity for 5 days in an atmosphere of nitrogen gas and half-cured after 10 days.

EXAMPLE 3

20 parts of trifunctional polyether having a molecular weight of 5000 obtained by adducting propylene oxide to glycerol and 80 parts of difunctional polyether having a molecular weight of 5000 obtained by adducting propylene oxide to propylene glycol were mixed. 14 parts of 4,4'-diphenylmethanediisocyanate was added to the resulting polyether mixture and reacted to obtain polyurethane prepolymer having 2.5% terminal NCO group content. (Prepolymer D)

23 parts of calcium carbonate and 10 parts of titanium oxide were added to 100 parts of Prepolymer D to obtain a sealant composition.

20 parts of trifunctional polyether having a molecular weight of 5000 and 70% oxyethylene unit content obtained by adducting in random propylene oxide and ethylene oxide to glycerol and 80 parts of difunctional polyether having a molecular weight of 5000 and 70% oxyethylene unit content obtained by adducting in random ethylene oxide to propylene glycol were mixed. Toluenediisocyanate was added to the resulting polyether mixture and reacted at a temperature 90° C. for about 3 hours to obtain water-swellable polyurethane prepolymer having 2.0% of terminal NCO group content. (Prepolymer E)

30 parts of Prepolymer E was added to 100 parts of the sealant composition to obtain a water-swellable moisture-curing one-package polyurethane sealant.

The resulting sealant had good stability and availability after 6 months storage in an atmosphere of nitrogen gas.

COMPARATIVE EXAMPLE 3

23 parts of calcium carbonate and 10 parts of titanium oxide were added to 100 parts of Prepolymer E to obtain a sealant composition. The sealant composition remarkably showed an increase in its viscosity for 5 days in an atmosphere of nitrogen gas and half-cured after 10 days. It is obvious that the storage stability of the sealant composition of Comparative example 3 is very much poorer than that of the sealant of Example 3.

EXAMPLE 4

23 parts of calcium carbonate and 10 parts of titanium oxide were added to 100 parts of Prepolymer A to obtain a sealant composition.

50 parts of Prepolymer B was added to 100 parts of the sealant composition to obtain a water-swellable moisture-curing one-package polyurethane sealant.

Resulted sealant had good stability and availability after 6 months storage in an atmosphere of nitrogen gas.

Table 2 shows properties of sealants obtained in Example 3, 4, and Comparative Example 3.

immersed in water and the weight increase was measured as time elasped.

The water swelling percentage $(\%) = (B-A) \times 100/A$, wherein

A is: the weight of the sample piece before it is immersed in water (g), and

B is: the weight of the sample piece after it is immersed in water (g)

FIG. 1 also shows as a control test sample the water swelling percent of non water-swellable sealant obtained by mixing a filler with Prepolymer C.

FIG. 1 illustrates that the water swelling property of the sealants obtained in Example 1 to 4 are excellent.

Figure 2:
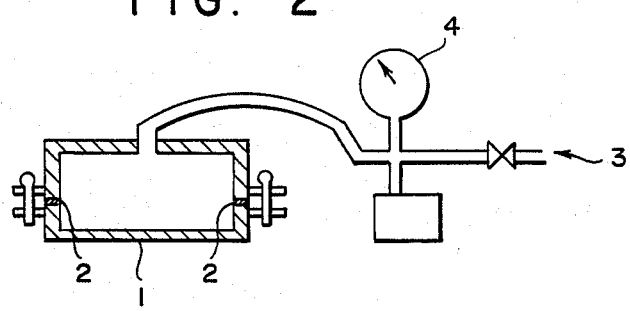
FIG. 2 is a rough cross-sectional view of an apparatus used for a water sealing test of a water-swellable sealant.

Water sealing effect of the sealant was tested using the method illustrated in FIG. 2. The polyurethane sealants 2 obtained in Examples 1 to 4 were coated on the joint of a steel vessel 1 which comprises upper and lower parts. After 2 day's curing, water was poured into the vessel 1 through its water pouring mouth 3. There were no water leakage from the joint for a water pressure of 3 kg/cm$^2$. This means that the sealant of the present invention has excellent water sealing effects.

EXAMPLES 5, 6, 7, 8

Fillers shown in Table 3 were added to 100 parts of

TABLE 2

|  | STORAGE STABILITY | CURING PROPERTY (2 mm thickness) | PROPERTIES 10 DAYS AFTER CURING |
|---|---|---|---|
| EXAMPLE 3 | Stable for 6 months in the nitrogen gas | Surface tack free: 1 day Complete curing: 1 and half day | Shore A hardness 25 Tensile strength 20 kgf/cm$^2$ Elongation 1600% |
| COMPARATIVE EXAMPLE 3 | Half-cured and unavailable for 10 days in the nitrogen gas | | |
| EXAMPLE 4 | Stable after 6 months in the nitrogen gas | Surface tack free: 1 day Complete curing: 1 and half day | Shore A hardness 28 Tensile strength 26 kgf/cm$^2$ Elongation 1670% |

FIG. 1 shows water swelling percentage a water-swellable moisture-curing one-package polyurethane sealant obtained in Examples 1 to 4. Following is the test method.

Cured sheet was obtained by coating the sealant on a glass plate in a thickness of 2 mm and leaving the sealant for 10 days at room temperature. Obtained sheet was cut in 2×5 cm sample pieces. Each sample piece was Prepolymer D obtained in Example 3 to obtain sealant compositions. 30 parts of Prepolymer E obtained in Example 3 was added to 100 parts of each sealant composition to obtain water-swellable moisture-curing one-package polyurethane sealants. The resulting sealant had good stability and availability after 6 months storage in an atmosphere of nitrogen gas. Table 3 shows their properties.

TABLE 3

|  | FILLERS | (PARTS) |
|---|---|---|
| EXAMPLE 5 | (1) calcium carbonate | 20 |
|  | (2) silicone oxide | 10 |
|  | (3) calcium hydroxide | 2 |
|  | (4) carbon black | 2 |
| EXAMPLE 6 | (1) calcium carbonate | 20 |
|  | (2) talc | 10 |
|  | (3) glass powder | 3 |
| EXAMPLE 7 | (1) calcium carbonate | 20 |
|  | (2) vermiculite | 10 |
|  | (3) carbon black | 2 |
| EXAMPLE 8 | (1) calcium carbonate | 20 |
|  | (2) wollastonite | 10 |
|  | (3) titanium oxide | 2 |

|  | STORAGE STABILITY | CURING PROPERTY (2 mm thickness) | PROPERTIES 10 DAYS AFTER CURING |
|---|---|---|---|
| EXAMPLE 5 | Stable for 6 months in the nitrogen gas | Surface tack free: 1 day Complete curing: 1 and half day | Shore A hardness 26 Tensile strength 23 kgf/cm$^2$ Elongation 1610% |

TABLE 3-continued

| EXAMPLE 6 | Stable for 6 months in the nitrogen gas | Surface tack free: 1 day Complete curing: 1 and half day | Shore A hardness 28 Tensile strength 27 kgf/cm² Elongation 1570% |
|---|---|---|---|
| EXAMPLE 7 | Stable for 6 months in the nitrogen gas | Surface tack free: 1 day Complete curing: 1 and half day | Shore A hardness 26 Tensile strength 24 kgf/cm² Elongation 1600% |
| EXAMPLE 8 | Stable for 6 months in the nitrogen gas | Surface tack free: 1 day Complete curing: 1 and half day | Shore A hardness 27 Tensile strength 25 kgf/cm² Elongation 1590% |

I claim:

1. A water-swellable moisture-curing one-package polyurethane sealant comprising:

(1) 20 to 100 parts by weight of a water-swellable polyurethane prepolymer having 1.5–10% terminal NCO group content which is obtained by a polyisocyanate with one or more polyetherpolyols having the following general formula, $$R((OR_1)_nOH)_p \qquad (I)$$

wherein R is a polyhydric alcohol radical; $(OR_1)_n$ is a polyoxyalkylene chain comprising 50-90 weight % of oxyethylene units and 50-10 weight % of oxyalkylene units having 3-4 carbon atoms; n is a number which represents the polymerization degree of said polyoxyalkylene chain, such that n restricts the hydroxy group equivalent of said polyetherpolyol (I) to the range 500-4000; and p is a number selected from 2-8;

(2) 100 parts by weight of a non water-swellable polyurethane prepolymer having terminal NCO groups obtained by reacting a polyisocyanate with one or more polyetherpolyols having the following general formula, $$R_2((OR_3)_mOH)_q \qquad (II)$$

wherein $R_2$ is a polyhydric alcohol radical; $(OR_3)_m$ is a polyoxyalkylene chain comprising oxyethylene units having 3-4 carbon atoms; m is a number which represents the polymerization degree of said polyoxyalkylene chain, such that m restricts the hydroxy group equivalent of said polyetherpolyol (II) to the range 500-4000; and q is a number selected from 2-8; and (3) 2 to 100 parts by weight of a filler.

2. A method of preparing a water-swellable moisture-curing one-package polyurethane sealant comprising:

(a) mixing 2 to 100 parts by weight of a filler and 100 parts by weight of a non water-swellable polyurethane prepolymer having terminal NCO groups obtained by reacting polyisocyanate with one or more polyetherpolyols having the following general formula, $$R_2((OR_3)_mOH)_8 \qquad (II)$$

wherein $R_2$ is a polyhydric alcohol radical; $(OR_3)_m$ is a polyoxyalkylene chain comprising oxyethylene units having 3-4 carbon atoms; m is a number which represents the polymerization degree of said polyoxyalkylene chain, such that m restricts the hydroxy group equivalent of said polyetherpolyol (II) to the range 500-4000; and q is a number selected from 2-8, to form a non water-swellable polyurethane composition, (b) adding to said non water-swellable polyurethane composition 20 to 100 parts by weight of a water swellable polyurethane prepolymer having 1.5-10% terminal NCO group content which is obtained by reacting polyisocyanate with one or more polyetherpolyols having the following general formula, $$R((OR_1)_nOH)_p \qquad (I)$$

wherein R is a polyhydric alcohol radical; $(OR_1)_n$ is a polyoxyalkylene chain comprising 50-90 weight % of oxyethylene units and 50-10 weight % of oxyalkylene units having 3-4 carbon atoms; n is a number which represents the polymerization degree of said polyoxyalkylene chain, such that n restricts the hydroxy group equivalent of said polyetherpolyol (I) to the range 500-4000; and p is a number selected from 2-8.

3. The polyurethane sealant according to claim 1, wherein said water-swellable polyurethane prepolymer (1) is an amount of 30 to 70 parts by weight, and said filler is in an amount of 10 to 70 parts by weight.

4. The polyurethane sealant according to claim 1, wherein R is an aliphatic alcohol selected from the group consisting of dihydric alcohols, trihydric alcohols, tetrahydric alcohols, propylene glycol, and glycerol.

5. The polyurethane sealant according to claim 1, wherein said oxyalkylene units in component (1) comprise propylene oxide.

6. The polyurethane sealant according to claim 1, wherein said one or more polyetherpolyols in component (1) have a molecular weight of from 1000 to 10,000.

7. The polyurethane sealant according to claim 1, wherein said one or more polyetherpolyols in component (1) are difunctional polyetherpolyols represented by the following general formula, $$R'(COR'_1)_nOH)_2 \qquad (I\text{-}1)$$

wherein R' is a dihydric alcohol radical; $(OR'_1)_n$ is a polyoxyalkylene chain comprising 50-90 weight % of oxyethylene units and 50-10 weight % of oxpropylene units; and n is a number which represents the polymerization degree of said polyoxyalkylene chain, such that n restricts the hydroxy group equivalent of the polyetherpolyol to the range 500-4000.

8. The polyurethane sealant according to claim 7, wherein R' is propylene glycol.

9. The polyurethane sealant according to claim 1, wherein said one or more polyetherpolyols in component (1) are trifunctional polyetherpolyols represented by the following general formula, $$R''(COR'_1)_nOH)_3 \qquad (I\text{-}2)$$

wherein R'' is a trihydric alcohol radical; $(OR'_1)_n$ is a polyoxyalkylene chain comprising 50–90 weight % of oxyethylene units and 50–10 weight % of oxypropylene units; and n is a number which represents the polymerization degree of said polyoxyalkylene chain, such that n restricts the hydroxy group equivlent of thepolyetherpolyol to the range 500–4000.

10. The polyurethane sealant according to claim 9, wherein R'' is polypropylene glycol.

11. The polyurethane sealant according to claim 1, wherein said one or more polyetherpolyols comprise a mixture of difunctional polyetherpolyols represented by the following general formula, $$R'((COR'_1)_nOH)_2 \qquad (I\text{-}1)$$

wherein R' is a dihydric alcohol radical; $(OR'_1)_n$ is a polyoxyalkylene chain comprising 50–90 weight % of oxyethylene units and 50–10 weight % of oxypropylene units; and n is a number which represents the polymerization degree of said polyoxyalkylene chain, such that n restricts the hydroxy group equivalent of the polyetherpolyol to the range 500–4000, and trifunctional polyetherpolyols represented by the following general formula, $$R''(COR'_1)_nOH)_3 \qquad (I\text{-}2)$$

wherein R'' is a trihydric alcohol radical; $(OR'_1)_n$ is a polyoxyalkylene chain comprising 50–90 weight % of oxyethylene units and 50–10 weight % of oxypropylene units; and n is a number which represents the polymerization degree of said polyoxyalkylene chain, such that n restricts the hydroxy group equivalent of the polyetherpolyol to the range 500–4000, in a weight ratio of from 9:1 to 7:3.

12. The polyurethane sealant according to claim 1, wherein said polyisocyanate is selected from the group consisting of:

isocyanates represented by the general formula,

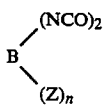

wherein B is a benzene or naphthalene ring, —NCO is a ring substituted isocyanate group, Z is a ring substituted halogen atom or alkyl or alkyoxy group having 3 or less carbon atoms, and n is the number 0, 1, or 2;
isocyanates represented by the general formula,

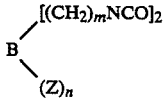

wherein B is a benzene or naphthalene ring, —$(CH_2)_m$NCO is a ring substituted alkyleneisocyanate group, Z is a ring substituted halogen atom or alkyl or alkoxy group having 3 or less carbon atoms, and n is the number 0, 1, or 2;
isocyanates represented by the general formula,

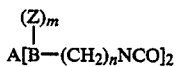

wherein A is —$CH_2$— or an alkylene group having 3 or more carbon atoms, B is a benzene or a naphthalene ring, —$(CH_2)_n$NCO is a ring substituted alkyleneisocyanate group, Z is a ring substituted halogen atom or alkyl or alkoxy group having 3 or less carbon atoms, and n is the number 0, 1, or 2;
isocyanates represented by the general formula,

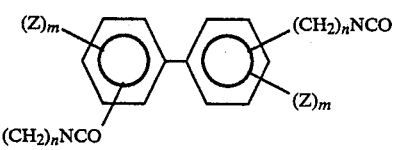

wherein Z is a ring substituted halogen atom or alkyl or alkoxy group having 3 or less carbon atoms and m is the number 0, 1, or 2;
diphenylsulfone-4,4'-diisocyanate; propane-1,2-diisocyanate; 2,3-dimethylbutane-2,3-diisocyanate; 2-methylpentane-2,4-diisocyanate; octane-3,6-diisocyanate; 3,3-dinitropentane-1,5-diisocyanate; octane-1,6-diisocyanate; and hexamethylenediisocyanate.

13. The polyurethane sealant according to claim 1, wherein said polyisocyanate is selected from the group consisting of:
isocyanates represented by the general formula,

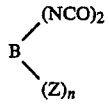

wherein B is a benzene or naphthalene ring, —NCO is a ring substituted isocyanate group, Z is a ring substituted halogen atom or alkyl or alkyoxy group having 3 or less carbon atoms, and n is the number 0, 1, or 2;
isocyanates represented by the general formula,

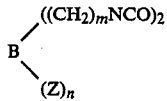

wherein B is a benzene or naphthalene ring, —$(CH_2)_m$NCO is a ring substituted alkyleneisocyanate group, Z is a ring substituted halogen atom or alkyl or alkoxy group having 3 or less carbon atoms, and n is the number 0, 1, or 2;
isocyanates represented by the general formula,

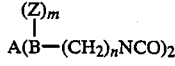

wherein A is a —$CH_2$— or an alkylene group having 3 or more carbon atoms, B is a benzene or a naphthalene ring, —$(CH_2)_n$NCO is a ring substituted alkyleneisocyanate group, Z is a ring substituted halogen atom or alkyl or alkoxy group having 3 or less carbon atoms, and n is the number 0, 1, or 2;

isocyanates represented by the general formula,

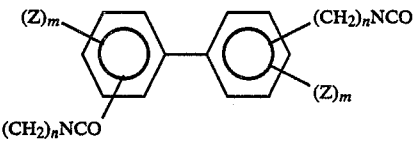

wherein Z is a ring substituted halogen atom or alkyl or alkoxy group having 3 or less carbon atoms and m is the number 0, 1, or 2;

diphenylsulfone-4,4'-diisocyanate; propane-1,2-diisocyanate; 2,3-dimethylbutane-2,3-diisocyanate; 2-methylpentane-2,4-diisocyanate; octane-3,6-diisocyanate; 3,3-dinitropentane-1,5-diisocyanate; octane-1,6-diisocyanate; and hexamethylenediisocyanate.

14. The polyurethane sealant according to claim 1, wherein $R_2$ is a aliphatic alcohol selected from the group consisting of dihydric alcohols, trihydric alcohols, tetrahydric alcohols, propylene glycol, and glycerol.

15. The polyurethane sealant according to claim 1, wherein said oxyalkylene units in component (2) comprise polypropylene oxide.

16. The polyurethane sealant according to claim 1, wherein said one or more polyetherpolyols in componeent (2) have a molecular weight of 1000 to 9000.

17. The polyurethane sealant according to claim 1, wherein said one or more polyetherpolyols in component (2) comprise a mixture of di- and tri-functional polyetherpolyols obtained from propylene glycol and glycerol, the di- and tri-functional polyetherpolyols being in a weight ratio of from 9:1 to 1:9.

18. The polyurethane sealant according to claim 17, wherein said polyisocyanate in component (2) is 4,4'-diphenylmethane diisocyanate.

19. The polyurethane sealant according to claim 1, wherein said filler is a material selected from the group consisting of calcium carbonate, pearlite, silicon oxide, talc, vermiculite, wollastonite, glass, carbon black, titanium oxide, and mixtures thereof.

20. The polyurethane sealant according to claim 19, wherein said filler comprises a mixture of calcium carbonate and titanium oxide.

21. The polyurethane sealant according to claim 1, further comprising a material selected from the group consisting of placticizers, thixotropic agents, and asphalt.

22. The polyurethane sealant according to claim 13, wherein said terminal NCO group content of said water-swellable polyurethane prepolymer is in an amount of 1.5-5%.

* * * * *